(12) United States Patent
Lawrence et al.

(10) Patent No.: US 11,436,626 B2
(45) Date of Patent: Sep. 6, 2022

(54) AUTHENTICATED ACCOUNT INTERACTION VIA CELLULAR TEXT MESSAGE

(71) Applicant: Comenity LLC, Columbus, OH (US)

(72) Inventors: Jess Lawrence, Lewis Center, OH (US); Uchenna Chilaka, Blacklick, OH (US); Christian Billman, Gahanna, OH (US); Timothy D. Pontious, Gahanna, OH (US); Christina Mosholder, Powell, OH (US)

(73) Assignee: Comenity LLC, Columbus, OH (US)

( * ) Notice: Subject to any disclaimer, the term of this patent is extended or adjusted under 35 U.S.C. 154(b) by 224 days.

(21) Appl. No.: 16/657,404

(22) Filed: Oct. 18, 2019

(65) Prior Publication Data

US 2020/0051115 A1 Feb. 13, 2020

Related U.S. Application Data

(63) Continuation-in-part of application No. 16/042,142, filed on Jul. 23, 2018.
(Continued)

(51) Int. Cl.
*H04W 12/00* (2021.01)
*H04W 4/14* (2009.01)
(Continued)

(52) U.S. Cl.
CPC ......... *G06Q 30/0228* (2013.01); *H04L 63/08* (2013.01); *H04W 4/14* (2013.01); *H04W 12/06* (2013.01)

(58) Field of Classification Search
CPC ..... G06Q 30/0228; H04L 63/08; H04W 4/14; H04W 12/06; H04W 12/77
See application file for complete search history.

(56) References Cited

U.S. PATENT DOCUMENTS

| 7,318,049 B2 | 1/2008 | Iannacci |
| 7,702,918 B2 | 4/2010 | Tattan et al. |

(Continued)

FOREIGN PATENT DOCUMENTS

| CN | 105703910 A | * | 6/2016 | ........... H04L 9/3213 |
| WO | WO-2018022993 A1 | * | 2/2018 | ........... G06K 7/1443 |

OTHER PUBLICATIONS

Can you trace someone through picture header information?, 2016-05-06T01:28:55, StackExchange, https://security.stackexchange.com/questions/122449/can-you-trace-someone-through-picture-header-information , Accessed: Jul. 29, 2021 (Year: 2016).*

(Continued)

*Primary Examiner* — Kambiz Abdi
*Assistant Examiner* — Dipen M Patel

(57) ABSTRACT

A computer system comprises a memory, a cellular telephony communications device configured for sending and receiving cellular text messages, and a processor coupled with the memory and the cellular telephony communications device. The processor is configured to: receive, via the cellular telephony communications device, a cellular text message sent from a cellular telephone of an accessing entity, wherein the cellular text message includes a cellular telephone number of the cellular telephone, an instruction regarding reward points, and an image file; use the cellular telephone number to identify a reward program account; extract an authentication token embedded in data of the image file; authenticate access to the reward program account based upon the authentication token; and in response to authenticating access to the reward program account, execute the instruction.

12 Claims, 8 Drawing Sheets

Related U.S. Application Data

(60) Provisional application No. 62/747,498, filed on Oct. 18, 2018, provisional application No. 62/625,603, filed on Feb. 2, 2018.

(51) Int. Cl.
  *G06Q 30/02* (2012.01)
  *H04L 9/40* (2022.01)
  *H04W 12/06* (2021.01)

(56) References Cited

U.S. PATENT DOCUMENTS

| | | | |
|---|---|---|---|
| 8,763,901 B1 | 7/2014 | McGhie et al. | |
| 9,088,556 B2* | 7/2015 | Truskovsky | G06F 21/45 |
| 9,367,856 B1 | 6/2016 | Hattikudru et al. | |
| 9,614,838 B1* | 4/2017 | Duchin | G06F 21/35 |
| 9,704,174 B1 | 7/2017 | McGhie et al. | |
| 9,972,047 B1 | 5/2018 | Elliott et al. | |
| 10,565,361 B2* | 2/2020 | Leddy | G06K 9/68 |
| 2003/0200144 A1 | 10/2003 | Antonucci et al. | |
| 2004/0249710 A1 | 12/2004 | Smith et al. | |
| 2006/0072144 A1* | 4/2006 | Dowling | H04N 1/4486 358/1.15 |
| 2009/0259549 A1* | 10/2009 | Winand | G06Q 10/08 705/14.35 |
| 2010/0042517 A1 | 2/2010 | Paintin et al. | |
| 2011/0004558 A1 | 1/2011 | Maclean et al. | |
| 2012/0164982 A1* | 6/2012 | Klein | G07C 13/00 455/411 |
| 2013/0066722 A1* | 3/2013 | Alkatib | G06Q 30/0203 705/14.64 |
| 2013/0268342 A1 | 10/2013 | Tune et al. | |
| 2014/0032297 A1* | 1/2014 | Germann | G06Q 30/0226 705/14.26 |
| 2014/0049653 A1* | 2/2014 | Leonard | H04N 5/44 348/207.1 |
| 2014/0108340 A1* | 4/2014 | Osher | H04N 21/4524 707/623 |
| 2014/0304054 A1 | 10/2014 | Orun et al. | |
| 2014/0358661 A1* | 12/2014 | Or | G06Q 30/0226 705/14.27 |
| 2015/0161883 A1* | 6/2015 | Satgunam | G08C 17/02 340/5.8 |
| 2016/0026866 A1* | 1/2016 | Sundaresan | G06Q 30/0631 705/26.7 |
| 2016/0092904 A1 | 3/2016 | Simons et al. | |
| 2016/0150078 A1 | 5/2016 | Joshi et al. | |
| 2018/0247296 A1* | 8/2018 | Win | G06Q 20/3255 |
| 2019/0050888 A1 | 2/2019 | Elder et al. | |
| 2021/0158341 A1* | 5/2021 | Duke | G06Q 20/3226 |

OTHER PUBLICATIONS

Chris Hoffman, How to See Exactly Where a Photo Was Taken (and Keep Your Location Private), May 17, 2017, https://www.howtogeek.com/211427/how-to-see-exactly-where-a-photo-was-taken-and-keep-your-location-private/ (Year: 2017).*

Wang et al., Optical image authentication scheme using dual polarization decoding configuration, Sep. 25, 2018, ScienceDirect, https://www.sciencedirect.com/science/article/pii/S01438166183093577via%3Dihub, https://doi.org/10.1016/j.optlaseng.2018.09.008 (Year: 2018).*

John Graham-Cumming, A simple code for entering latitude and longitude to GPS devices, Jul. 10, 2006, https://blog.jgc.org/2006/07/simple-code-for-entering-latitude-and.html (Year: 2006).*

Kuseler et al., Using Geographical Location as an Authentication Factor to Enhance mCommerce Applications on Smartphones, 2012, International Journal of Computer Science and Security (IJCSS), vol. (6) : Issue (4), http://citeseerx.ist.psu.edu/viewdoc/download?doi=10.1.1.736.6702&rep=rep1&type=pdf (Year: 2012).*

* cited by examiner

500

```
┌─────────────────────────────────────────────────────────────┐
│ RECEIVE A CELLULAR TEXT MESSAGE SENT FROM A CELLULAR        │
│ TELEPHONE OF AN ACCESSING ENTITY, WHEREIN THE CELLULAR      │
│ TEXT MESSAGE INCLUDES A CELLULAR TELEPHONE NUMBER OF THE    │
│ CELLULAR TELEPHONE, AN INSTRUCTION REGARDING REWARDS        │
│ PROGRAM POINTS, AND AN IMAGE FILE                           │
│ 510                                                         │
└─────────────────────────────────────────────────────────────┘
                              ↓
┌─────────────────────────────────────────────────────────────┐
│ USE THE CELLULAR TELEPHONE NUMBER TO IDENTIFY A REWARDS     │
│ PROGRAM ACCOUNT                                             │
│ 520                                                         │
└─────────────────────────────────────────────────────────────┘
                              ↓
┌─────────────────────────────────────────────────────────────┐
│ EXTRACT AN AUTHENTICATION TOKEN EMBEDDED IN DATA OF THE     │
│ IMAGE FILE                                                  │
│ 530                                                         │
└─────────────────────────────────────────────────────────────┘
                              ↓
┌─────────────────────────────────────────────────────────────┐
│ AUTHENTICATE ACCESS TO THE REWARDS PROGRAM ACCOUNT BASED    │
│ UPON THE AUTHENTICATION TOKEN                               │
│ 540                                                         │
└─────────────────────────────────────────────────────────────┘
                              ↓
┌─────────────────────────────────────────────────────────────┐
│ RESPONSIVE TO AUTHENTICATING ACCESS TO THE REWARDS PROGRAM  │
│ ACCOUNT, EXECUTE THE INSTRUCTION                            │
│ 550                                                         │
└─────────────────────────────────────────────────────────────┘
```

EXECUTE THE INSTRUCTION, WHEREIN THE INSTRUCTION COMPRISES A REQUEST FOR AN ACCOUNT BALANCE

SEND A REQUEST FOR AUTHENTICATION VIA A SECOND CELLULAR TEXT MESSAGE TO A SECOND CELLULAR TELEPHONE NUMBER ASSOCIATED WITH THE SECOND REWARDS PROGRAM ACCOUNT
551

EXECUTE THE INSTURCTION, WHEREIN THE INSTRUCTION COMPRISES A REQUEST TO TRANSFER A SPECIFIED NUMBER OF POINTS FROM THE REWARDS PROGRAM ACCOUNT TO A SECOND REWARDS PROGRAM ACCOUNT ASSOCIATED WITH A SECOND ENTITY

SEND A REQUEST FOR AUTHENTICATION VIA A SECOND CELLULAR TEXT MESSAGE TO A SECOND CELLULAR TELEPHONE NUMBER ASSOCIATED WITH THE SECOND REWARDS PROGRAM ACCOUNT
552

RECEIVE FROM THE SECOND CELLULAR TELEPHONE NUMBER A SECOND IMAGE FILE
553

EXTRACT A SECOND AUTHENTICATION TOKEN EMBEDDED IN DATA OF THE SECOND IMAGE FILE
554

AUTHENTICATE, BY THE COMPUTER SYSTEM, ACCESS TO THE SECOND REWARDS PROGRAM ACCOUNT BASED UPON THE AUTHENTICATION TOKEN
555

RESPONSIVE TO AUTHENTICATING ACCESS TO THE SECOND REWARDS PROGRAM ACCOUNT, TRANSFER THE SPECIFIED NUMBER OF POINTS FROM THE REWARDS PROGRAM ACCOUNT TO THE SECOND REWARDS PROGRAM ACCOUNT
556

FIG. 5C

AUTHENTICATED ACCOUNT INTERACTION VIA CELLULAR TEXT MESSAGE

CROSS-REFERENCE TO RELATED APPLICATIONS (PROVISIONAL)

This application claims priority to and benefit of U.S. Provisional Patent Application No. 62/625,603 filed on Feb. 2, 2018, entitled "AN INTERMEDIARY TO MANAGE A POINT EXCHANGE ACROSS A PLURALITY OF DIFFERENT REWARD PROGRAMS" by James Magnuson, Jr. et al., and assigned to the assignee of the present application, the disclosure of which is hereby incorporated herein by reference in its entirety.

This application claims priority to and benefit of U.S. Provisional Patent Application No. 62/747,498 filed on Oct. 18, 2018, entitled "AN INTERMEDIARY TO MANAGE A POINT EXCHANGE ACROSS A PLURALITY OF DIFFERENT REWARD PROGRAMS" by Jess Lawrence et al., and assigned to the assignee of the present application, the disclosure of which is hereby incorporated herein by reference in its entirety.

CROSS-REFERENCE TO RELATED APPLICATIONS CONTINUATION IN PART

This application is a continuation-in-part application of and claims priority to and benefit of co-pending U.S. patent application Ser. No. 16/042,142 filed on Jun. 23, 2018 entitled "INTERMEDIARY TO MANAGE A POINT EXCHANGE ACROSS A PLURALITY OF DIFFERENT REWARD PROGRAMS" by James Magnuson Jr. et al., and assigned to the assignee of the present application, the disclosure of which is hereby incorporated herein by reference in its entirety.

BACKGROUND

Company specific, brand specific and even store specific reward programs provide significant value to both consumer and provider. By issuing reward points to a participant in a reward program, the provider is able to maintain consumer brand loyalty. Similarly, the consumer receives the perks from utilizing the reward points. However, unclaimed reward points will deleteriously remain as an outstanding liability on the reward points provider's books.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIGS. 5A-5C depict a flow diagram of a method of authenticated reward program interaction, in accordance with various embodiments.

DESCRIPTION OF EMBODIMENTS

Figure 1:
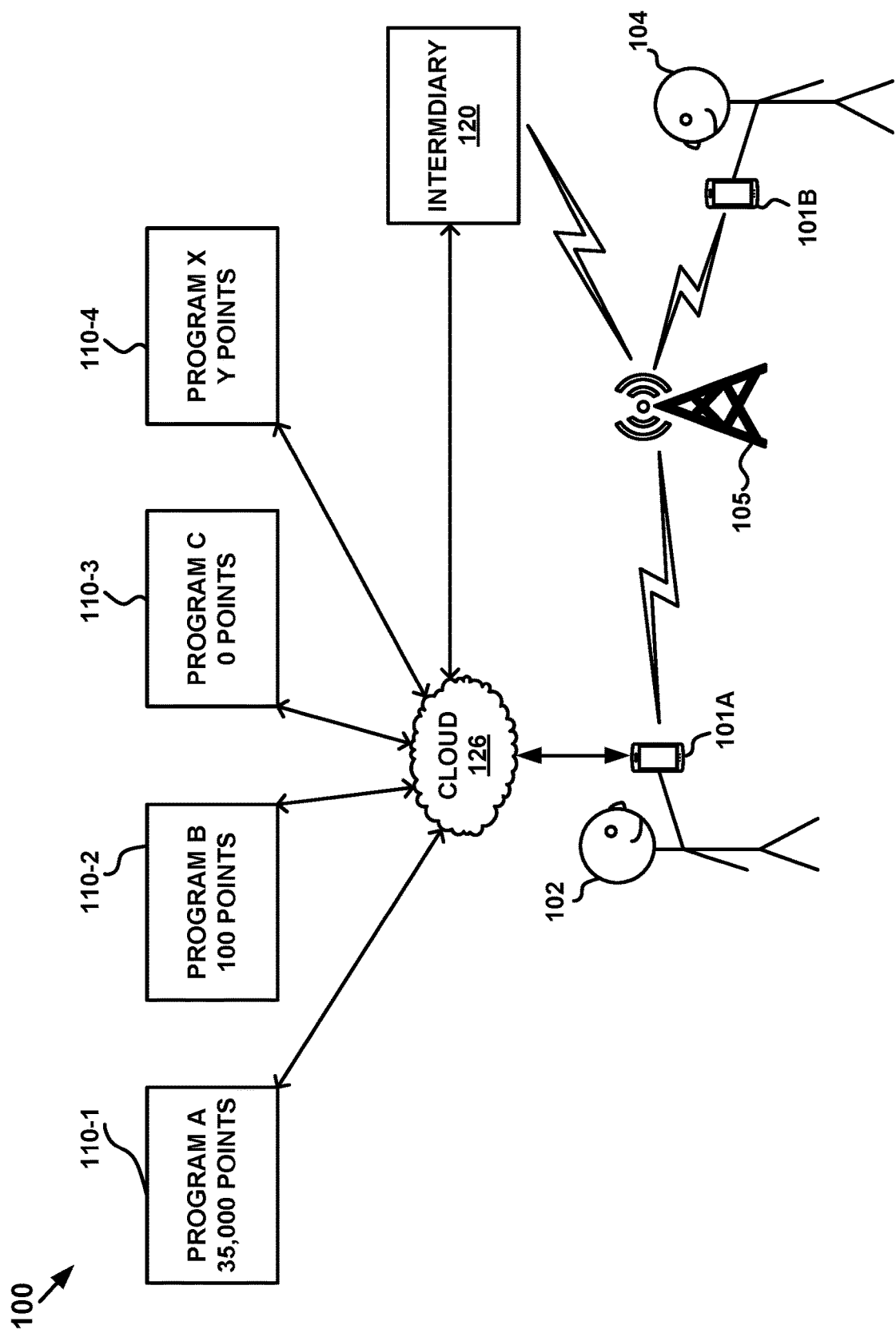
FIG. 1 is a block diagram of one or more computing devices communicating via the cloud and/or via a cellular messaging services to one of an intermediary service and a plurality of different reward programs is shown in accordance with various embodiments.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting", "deploying" "using," "extracting," authenticating," "executing," "confirming," "sending," "transferring," or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining or accessing of user information conforms to applicable privacy laws (e.g., federal privacy laws, state privacy laws, etc.) and applicable fair credit reporting act laws. In one embodiment, prior to accessing user information, the user affirmatively "opts-in" to the services described herein. For example, during the use of an issuer's mobile application, the user is prompted with a choice to affirmatively "opt-in" to various services. As a result, any information is obtained with the user's prior permission. Moreover, depending on present or future credit account requirements, rules and regulations, the credit application aspects described herein may be more or less formal.

Overview

For purposes of the following discussion, the term "reward program" or the term "rewards program" refers to a marketing strategy program used by a merchant that utilizes points (also referred to herein as "reward points") as a means for attracting new customers, rewarding existing customers, rewarding customer purchases, and the like. Basically, the reward program provides a varying number of reward points for different acts such as: signing up, making a purchase, an anniversary of one or more dates, etc. In general, after performing one or more of the acts, the reward program will provide a given number of reward points to the customer. Because of the different types of reward points provided, the actual monetary value of each reward point can be different across merchants and even across different reward programs for the same merchant.

For example, a coffee shop could provide reward points such that after 9 coffee purchases, the $10^{th}$ coffee is free. In this case, the reward point would have a value of $\frac{1}{9}^{th}$ of the price of a cup of coffee. In a multi-tiered point program, such as a credit card reward program, there could be a varying number of points that are earned depending on what is being purchased. For example, a certain number of points (e.g., 1 point) are earned for each hundred dollars spent on any purchases, a different number of points (e.g., 2 points) are earned for each hundred dollars spent on grocery purchases, yet a different number of points (e.g., 5 points) are earned for each hundred dollars spent on airline travel purchases, etc. In one embodiment, each point earned through a multi-tiered reward program would be the same value regardless of how it was earned. In another example, a merchant may have a number of different reward programs, and the points in each of the different programs could have the same or varying values depending upon the program.

In general, the exchange provides an entity (e.g., a user, customer, reward point holder, etc.) with access to a wider network of participating point programs and the capability for the entity to exchange points received from one retailer program to points for another retailer program. The exchange will include retailers and reward program management companies (i.e., credit card companies, multi-tender loyalty companies, etc.) in the network that can authenticate transactions shared and provide input into the consensus model for the exchange program. Once points are exchanged, the exchange will provide an update to each of the reward program management companies to update the balances for each affected account. Additionally, in one embodiment the exchange will deduct a certain amount of points from the total for each exchange, providing a steady state of "point's burn" to prevent unlimited liability. In one embodiment, the exchange would charge a nominal fee for the exchange. In one embodiment, the fee would be shared with the retailers and/or reward program management companies to offset liability created by the additional rewards fulfillments.

In one embodiment, the exchange will transfer points from a reward program into an equivalent value of exchange currency, like a "point-coin" with its own value, expiration date, unique identifier, embedded business rules, and the like. In one embodiment, the exchange will use digital ledger technology and may be a distributed ledger maintained using blockchain technology. In one embodiment, the exchange is a software application that will reside on the entity's computing system (e.g., desktop, laptop, mobile device, etc.), maintain the entities' identity and confirm reward points balances for one or more reward programs.

Using the exchange provides a capability to determine and exchange value between two or more retailer reward programs with disparate point value assignments. The exchange further allows multiple retailers to participate in the points exchange program without requiring the retailers to set up relationships with each other. In one embodiment, the exchange utilizes a digital ledger methodology to on-board participating parties (e.g., credit card companies, multi-tender loyalty companies, etc.), identify points, verify user identity, exchange value across the users and confirm exchange transactions in the ledger for future reconciliation of the exchange. The exchange will track and monitor multiple reward programs and acceptable exchange rates between these programs. In one embodiment, the exchange utilizes its own monetary system such that business rules for managing the points are embedded in the points themselves or in the exchange's own monetary system, and not in the overall program used to manage the points.

Importantly, the embodiments of the present invention, as will be described below, provide a process for exchanging reward points from disparate reward programs which differs significantly from the conventional processes. In conventional approaches, exchanging points between programs is difficult and requires the different programs to work together, which is not likely in a competitive scenario. Such conventional approaches are not possible without significant support, and are tedious, time-consuming, and can oftentimes be flat-out denied as a point exchange opportunity. Such conventional approaches also require agreement on the value of the points to facilitate sharing points across participating retailers, which is difficult even amongst non-competitors and impractical when extended beyond just one or two participating retailers. However, the present embodiments, as will be described and explained below in detail, provide a previously unknown procedure to allow multiple retailers to participate in a points exchange program without requiring the retailers to set up relationships with each other. Thus, embodiments of the present invention provide a streamlined method for point exchange that includes tracking and monitoring multiple reward programs and acceptable exchange rates between these programs; providing authentication of the points being exchanged prior to allowing the exchange to occur; and in one embodiment, the exchange will utilize its own monetary system as the center of the exchange to provide a real-time point value exchange capability that extends well beyond what was previously possible using a conventional approach.

As will be described in detail, the various embodiments of the present invention do not merely implement conventional processes for utilizing an intermediary (or central exchange) to manage a point exchange across a plurality of different reward programs on a computer. Instead, the various embodiments of the present invention, in part, provide a previously unknown procedure for providing a method for point exchange that includes tracking and monitoring multiple reward programs and acceptable exchange rates between these programs, providing authentication of the points being exchanged prior to allowing the exchange to occur, and utilizing an exchange specific currency for its own monetary system as the center of the exchange process to provide a real-time point value exchange capability. Hence, embodiments of the present invention provide a novel process for reward program reward point exchange which is necessarily rooted in computer technology to overcome a problem specifically arising in the realm of reward point exchange.

Further, some embodiments present a procedure for authenticating user interaction with a reward points intermediary system (e.g., a reward program exchange) and/or the underlying reward program(s) by extracting two authentication factors from an instruction received by cellular text message. In these embodiments, a "cellular text message" refers to a message such as an SMS (short message service) or MMS (Multimedia Message service) that originates its transmission when wirelessly transmitted from a cellular device to a cellular network and terminates its transmission by being wirelessly transmitted from a cellular network to a computer system operating as part of a reward program reward point exchange (or similarly to a computer system operating as part of a reward points ledger of a reward program). Advantageously, accepting and authenticating such instruction from the cellular device of a using entity eliminates the need for the using entity to have an operable Internet connection to carry out authenticated interactions with a reward program, thus permitting a reward program member to carry out actions with respect to their points even when the internet may be locally inaccessible. As will be discussed, such user interactions may include, but are not limited to: checking the balance of points, redeeming points, exchanging/transferring points from a first reward program to a second rewards program, and peer-to-peer transfer of points (either within the same reward program or between different reward programs). These are merely examples, which are indicative of the many types of authenticated cellular text message interactions which may be facilitated.

Moreover, the embodiments do not recite a mathematical algorithm; nor do they recite a fundamental economic or longstanding commercial practice. Instead, they address a number of business challenges including providing a means of determining and exchanging value between multiple retailer reward programs with disparate point value assignments. Another benefit is the capability to allow multiple retailers to participate in a points exchange program without needing to establish relationships between the multiple retailers. Thus, the embodiments do not merely recite the performance of some business practice known from the pre-Internet world along with the requirement to perform it on the Internet. Instead, the embodiments are necessarily rooted in computer technology in order to overcome problems specifically arising in the realm of reward point utilization.

Operation

With reference now to FIG. 1, a block diagram 100 of one or more computing devices 101 (101A, 101B) communicating via the cloud 126 and/or via a cellular messaging service to one of an intermediary system 120 (e.g., a reward program exchange) and a plurality of different reward programs 110 are shown in accordance with various embodiments. Although a number of distinct reward programs 110 are shown in block diagram 100, it should be appreciated that one or more of the programs 110 could be found in a similar storage location, operating on computing device 101, on applications stored on computing device 101, or the like.

A computing device 101 (101A, 101B) may be a laptop, a desktop, a point of sale terminal, a mobile phone, a smart phone, a tablet, a smart watch, a piece of smart jewelry, smart glasses, or other electronic devices having wireless connectivity. A computing device 101 would be capable of broadcasting and receiving via at least one network cloud 126. In some embodiments, a computing device 101 is capable of wirelessly sending and receiving cellular text messages (e.g., SMS and/or MMS messages) via a cellular network 105. A computing device 101 can include one or more of the components described in detail in the description of FIG. 6.

Using entity 102 (a person enrolled in one or more reward programs 110) is depicted as using computing device 101A, which is coupled via the Internet to cloud 126 and is also configured to send and receive cellular text messages via cellular network 105.

Using entity 104 (a person enrolled in one or more reward programs 110) is depicted as using computing device 101B, which is not coupled to the Internet or to cloud 126 but is configured to send and receive cellular text messages via cellular network 105.

Intermediary system 120 is an intermediate system that may be disposed between a computing device 101 and one or more reward programs 110. Intermediary system 120 may act as an exchange which allows reward points of a reward program 110 (e.g. 110-1) to be exchanged for other value and or converted to reward points for a different reward program (e.g., 110-2, 110-2, 110-3 . . . 110-N). In some embodiments, intermediary system is implemented in whole or in part on a computer system such as computer system 600 of FIG. 6.

In one embodiment, intermediary system 120A is an application operating on the entity's computing device 101. In another embodiment, intermediary system 120A operates on a server that includes memory, processors, applications, operating systems and the like (such as described in FIG. 6). If intermediary system 120A operates on a remote server is could communicate with computing device 101 on a secure channel via cloud 126.

Cloud 126 represents a wired or wireless network such as the Internet, a wide area network (WAN), local area network (LAN), or the like. A wired network can include Ethernet cable(s), phone line(s), router(s), switch(es), and the like. Wireless communication network examples include: WiFi, Cellular, Bluetooth, NFC, and the like.

In the diagram, each of the plurality of different reward programs 110 includes a different number of reward points for purposes of clarity in the following discussion. However, it should be appreciated that there may be more of fewer points in one or more of the different reward programs 110 than shown. Further, the entity can be associated with more or fewer than the reward programs 110 shown.

Although the reward programs 110 are shown as being a network connection away from computing device 101, it should be appreciated that one or more of the programs 110 could be operating on computing device 101, such as applications on computing device 101, or the like. The distinct separation of programs 110 and computing device 101 is provided for purposes of clarity.

In one embodiment, the entity is a customer that is a member of at least two of the different reward programs 110. For example, the customer is a member of program A (110-1) and has 35,000 points and the customer would like to exchange some or all of programs A (110-1) points to obtain points for program X (110-N), of which the customer is also a member.

In another embodiment, the entity is a customer that is a member of one or more of the different reward programs 110 and would be using the point exchange to obtain program points for which the entity is not a member. For example, the customer is a member of program A (110-1) and has 35,000 points. However, the customer would like to exchange some or all of those program A (110-1) points to obtain points for program C (110-3), of which the customer is not a member.

In one embodiment, the entity is a customer that is a member of at least two of the different reward programs 110. For example, the customer is a member of program A (110-1) and has 35,000 points and program B (110-2) and has 100 points. In one embodiment, the customer would like to exchange some or all of programs A (110-1) points and some or all of program B (110-2) points to obtain points for program X (110-N), of which the customer is or is not a member.

In one embodiment, the exchange can also facilitate peer-to-peer exchange. The peer-to-peer exchange can be between two or more entities across any number of reward programs 110. For example, one entity is Customer X that is a member of one of the reward programs 110 and would like to exchange reward points with a different Customer Y of the same or different reward program 110. For example, Customer X in program A (110-1) can exchange reward points with Customer Y in program B (110-2) at a value that is appropriate within the rules of each reward program.

In another embodiment, the two peers in a peer-to-peer exchange may both be retail participants. For example, in one such embodiment, a first peer retailer (retailer A) may be facing bankruptcy and/or closure. Retailer A may sell assets to retailer B, another retailer. An aspect of that sale could include the exchange of the rewards points program from Retailer A to Retailer B on behalf of the customers that have access to the points. This would be instead of Retailer B taking over Retailer A's program and managing and reconciling both. Instead this process facilitates the reconciliation and merger of the programs by using the rules established in the ledger, which may be a block-chain ledger. From a customer's perspective this could allow rewards point utility to continue without frustration caused when one brand buys another but invalidates the old programs. From a retailer's point of view this provides a bank of customers who can fulfill as a way to maintain comp sales without needing to suddenly increase liability through extra discounting to regain loyalty.

Figure 2:
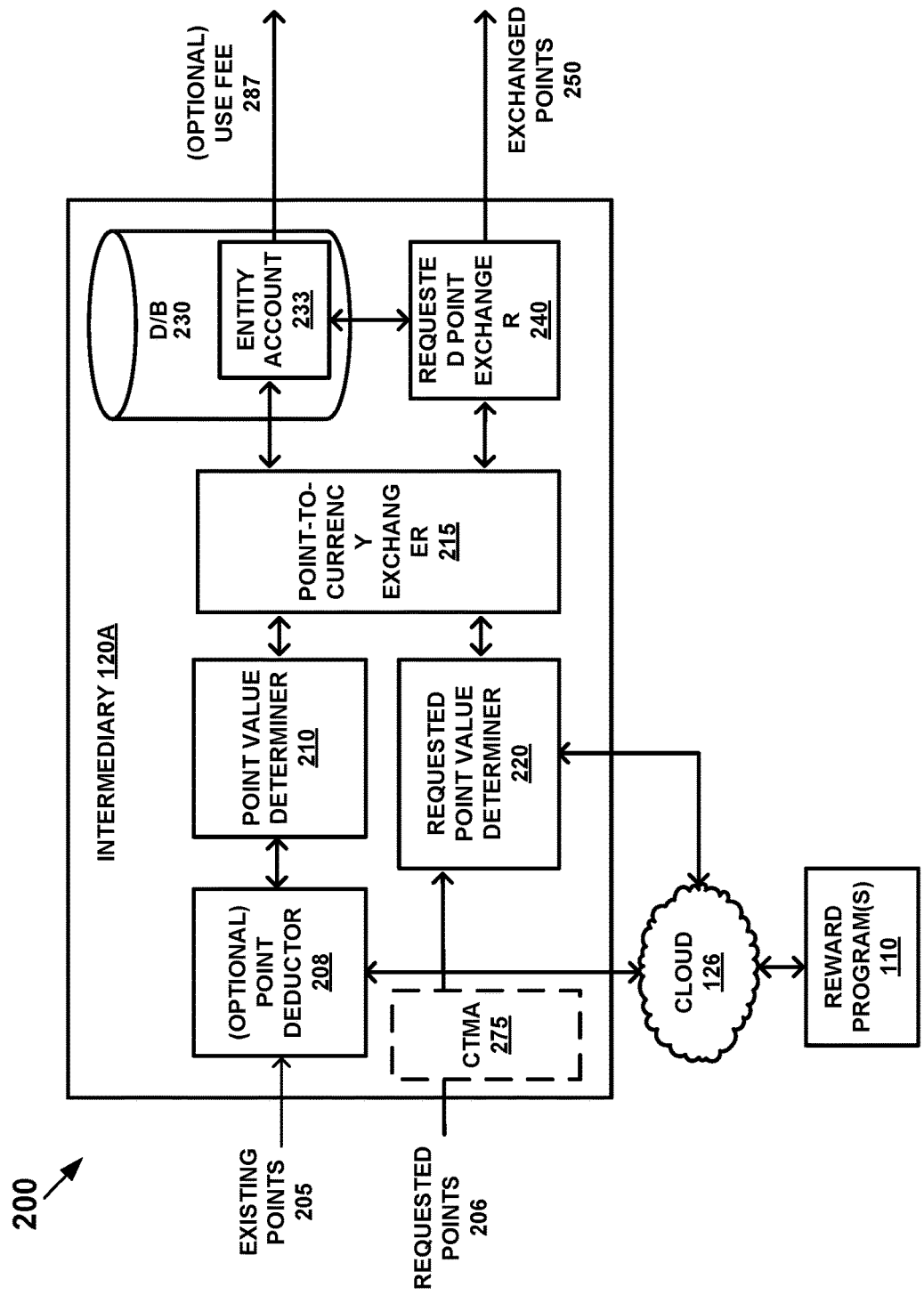
FIG. 2 is a block diagram of an intermediary system to manage a point exchange across a plurality of different reward programs, in accordance with an embodiment.

Referring now to FIG. 2, a block diagram 200 of an intermediary system 120A (e.g., a central exchange) to manage a point exchange across a plurality of different reward programs is shown in accordance with an embodiment. Although a number of distinct components are shown in block diagram 200, it should be appreciated that one or more of the components of intermediary system 120A may be combined. Similarly, one or more of the components of intermediary system 120A could be located separately from one another and communicate via cloud 126 or the like.

In one embodiment, intermediary system 120A is an application operating on the entity's computing device 101. In another embodiment, intermediary system 120A operates on a server that includes memory, processors, applications, operating systems and the like (such as described in FIG. 6). If intermediary system 120A operates on a remote server is could communicate with computing device 101 on a secure channel via cloud 126. In one embodiment, intermediary system 120A is responsible for data provided by an application operating on computing device 101 and can include the entity database 230 that stores account details for the entity account 233.

In general, intermediary system 120A receives existing points 205 which are reward points that have already been awarded to an entity. Intermediary system 120A also receives a requested points 206 input. Requested points 206 are the points which the entity would like to obtain in exchange for some or all of the existing points 205. Intermediary system 120A will provide some number of the exchanged points 250. Requested points 206 may be received via cloud 126 or via a cellular text message.

In one embodiment, if there is a use fee 287, the use fee 287 is also provided by intermediary system 120A. The use fee 287 could be provided to reward program management companies to offset liability created by the additional rewards fulfillments, to retailers, to a provider or maintainer of intermediary system 120A, another party, or a combination of two or more of the different parties.

Intermediary system 120A includes an optional point deductor 208, point value determiner 210, point-to-currency exchanger 215, requested point value determiner 220, database 230, and requested point exchanger 240. In some embodiments, intermediary system 120A may further include cellular text message authenticator (CTMA) 275.

Optional point deductor 208 receives the existing points 205 and then deducts some portion thereof. For example, optional point deductor 208 will deduct a certain amount of points from the total for each exchange, thereby providing a steady state of "points burn" to prevent unlimited liability. In one embodiment, optional point deductor 208 will utilize a network connection such as cloud 126 to access the reward program(s) 110 and inform the point program of the points burn.

In one embodiment, point deductor 208 includes a point life expectancy feature. For example, in one embodiment the point life expectancy feature is an on/off configuration for the exchange network on the whole. If on, existing points 205 (or their equivalent intermediary currency, or the exchanged points 250) would have a date at which they will lose value or disappear from the entity account 233. Likewise, existing points 205 (or their equivalent intermediary currency, or the exchanged points 250) could decrease in value over time.

In one embodiment, the life expectancy feature could be reset when transferred from one brand to the other either because the particular token has an expiration reset or more informally because the points leave the network (e.g., intermediary system 120A) and then rejoin at a later date. If the life expectancy feature is off, the network functions exactly as-is with no additional loss in value of existing points 205 (or their equivalent intermediary currency, or the exchanged points 250). By utilizing the on/off life expectancy feature, point deductor 208, will enable some breakage if at a later date it is determined breakage needs to be introduced. In one embodiment, points already in the network prior to the life expectancy feature being turned on would maintain their "immortal" status while any new points would have a mortality rate with dates.

Point value determiner 210 will determine the monetary value of each point from the received existing points 205. For example, point value determiner 210 will access the point reward information for each point provided. Examples of data (or a plurality of metrics) associated with each first reward program reward point includes data, such as but not limited to, a date the first reward program reward point was issued, a time the first reward program reward point was issued, a physical location of computing device 101 when the first reward program reward point was issued, a monetary value of the first reward program reward point on a date the first reward program reward point was issued by a first reward program, information identifying the first reward program, information identifying the entity that owns the first reward program reward point, information identifying a date the first reward program reward point was obtained by the entity, and the like. In so doing, point value determiner 210 will be able to determine the actual monetary value of each point of existing points 205 and therefore the total monetary value for existing points 205.

When included, cellular text message authenticator 275 operates to authenticate cellular text messages received wirelessly from a cellular network 105 by intermediary system 120A.

Requested point value determiner 220 operates similar to point value determiner 210 except that requested point value determiner 220 will determine the present value for each point of the requested points 206. In one embodiment, requested point value determiner 220 will utilize a network connection such as cloud 126 to access the reward program(s) 110 to obtain the present value of the requested points 206.

Point-to-currency exchanger 215 will receive the determined monetary value of the existing points 205 from point value determiner 210 and then change that value into an intermediary currency (or central exchange currency) value. Similarly, point-to-currency exchanger 215 will receive the present value for each point of the requested points 206 from requested point value determiner 220 and change that value into the intermediary currency. In general, the intermediary currency is a system specific currency utilized by intermediary system 120A to provide a standardized value system for any points that are being exchanged.

In one embodiment, the intermediary currency would have an actual value, e.g., redemption of points would effectively result in a flat exchange based on the value of the exchange specific currency. In one embodiment, the intermediary currency is an investment mechanism into the overall rewards platform.

In one embodiment, after the exchange of point-to intermediary currency, the intermediary currency is exchanged at requested point exchanger 240 for an equivalent amount of the requested points. The exchanged points 250 are then provided to the entity.

In one embodiment, such as the peer-to-peer exchange, the value of the points exchanged by each entity can be based on the initial exchange. For example, in a peer-to-peer exchange between customer X and customer Y, customer X has points in program A (110-1) and would like to exchange some of her program A (110-1) points to obtain 500 points from customer Y's program B (110-2). As such, the value of the program A (110-1) points of customer X would be determined by point-to-currency exchanger 215. Similarly, the value of the 500 points of customer Y's program B (110-2) would also be determined. Additionally, any fees or the like that would be deducted by optional point deductor 208 would also be determined. In one embodiment, any additional fees could be divided equally between the peers in the exchange or could be adjusted according to a negotiated percentage of up to 100% of the additional fees that could be deducted from one of the parties in the peer-to-peer group.

In an equal fee sharing example, using intermediary system 120A, the determination of the value of the 500 points from program B (110-2) is equivalent to 750 points from program A 110-1. In addition, the point deductor 208 would deduct 6 program A (110-1) points and 4 program B (110-2) points to make the exchange. As such, customer X will provide 756 program A (110-1) points while customer B will provide 604 program B (110-2) points into intermediary system 120A. The exchange would then provide the 500 program B (110-2) points to customer X and provide the 750 program A (110-1) points to customer B.

In a single party fee example, using intermediary system 120A, the determination of the value of the 500 points from program B (110-2) is equivalent to 750 points from program A (110-1). In addition, the point deductor 208 would deduct 6 program A (110-1) points for customer X's use of the exchange (and then an additional 6 program A (110-1) points for customer Y's use of the exchange) to make the exchange. As such, in one embodiment, customer X will provide 762 program A (110-1) points while customer B will provide 500 program B (110-2) points into intermediary system 120A. The exchange would then provide the 500 program B (110-2) points to customer X and provide the 750 program A (110-1) points to customer B. Alternatively, in another embodiment, customer X will provide 750 program A (110-1) points, from which 12 points will be deducted by point deductor 208 to arrive at 738 program A points; while customer B will provide 500 program B (110-2) points into intermediary system 120A. The exchange would then provide the 500 program B (110-2) points to customer X and provide the 738 program A (110-1) points to customer B. Although, two examples are shown, it should be appreciated that the fees could be split at percentages other than the equal split or 100% by one party.

In one embodiment, after the exchange of point-to intermediary currency, the value of the intermediary currency is added to an entity account 233 of database 230. It should be appreciated that database 230 can include a number of different entity accounts. By utilizing an entity account 233, the existing points 205 can be put into the exchange and some or all of the value can be exchanged from one or more different reward program reward points while the remaining value can be stored for later utilization.

Similarly, after the entity's intermediary currency is exchanged at requested point exchanger 240 for the number of requested points 206. There may be an amount remaining of intermediary currency following the exchange. The remaining intermediary currency can then be put into entity account 233 from requested point exchanger 240. Moreover, if the intermediary currency was initially placed into entity account 233 by point-to-currency exchanger 215, requested point exchanger 240 would access entity account 233 and deduct the amount of intermediary currency necessary to obtain the requested points 206.

Figure 3:
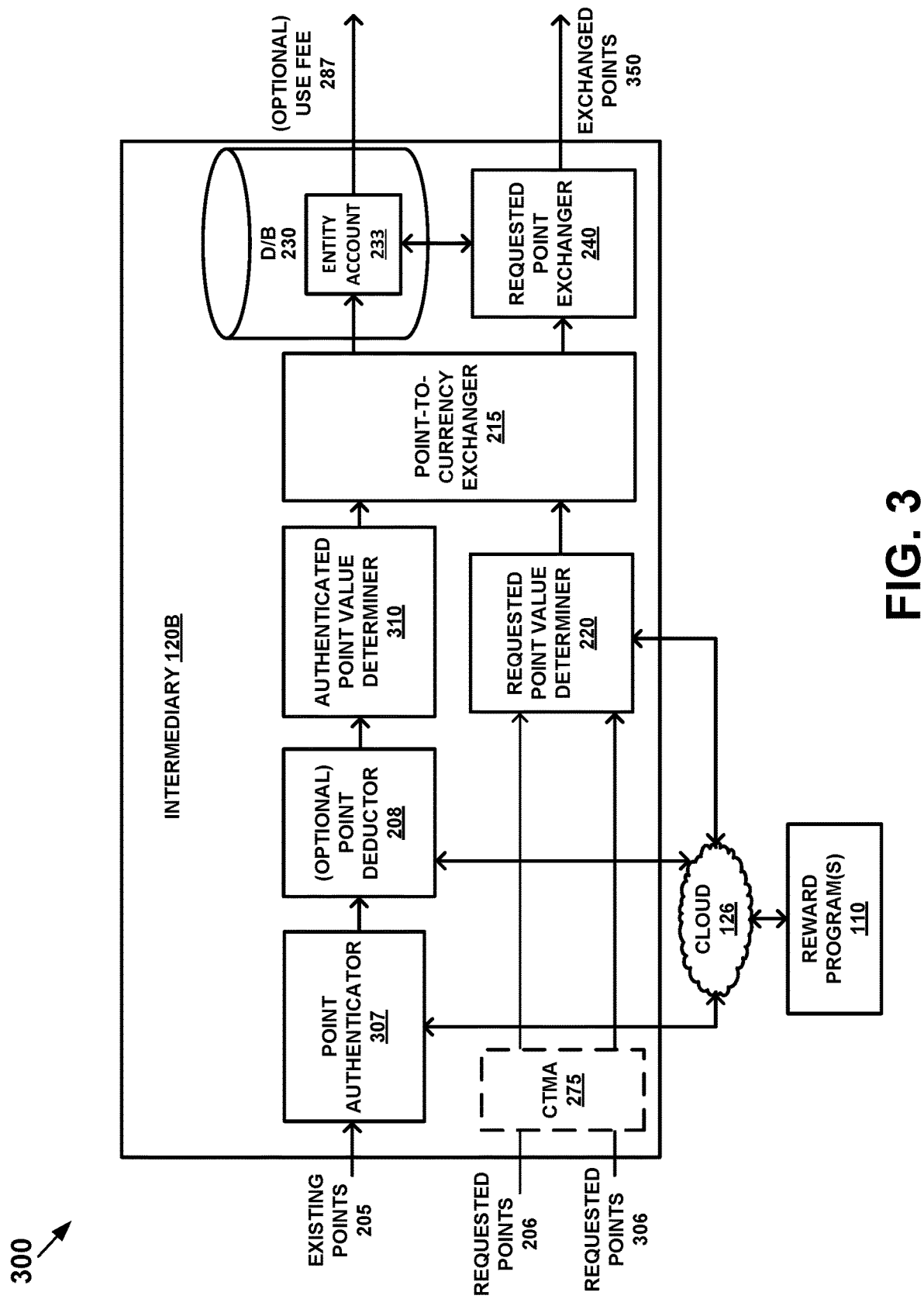
FIG. 3 is a block diagram of further detailed version of an intermediary system to manage a point exchange across a plurality of different reward programs, in accordance with an embodiment.

With reference now to FIG. 3, a block diagram 300 of further detailed version of an intermediary system 120B to manage a point exchange across a plurality of different reward program(s) 110 is shown in accordance with an embodiment. Although a number of distinct components are shown in block diagram 300, it should be appreciated that one or more of the components may be combined. Similarly, one or more of the components could be located separately from one another and communicate via cloud 126. For purposes of clarity, only those aspects of intermediary system 120B that are different from similar aspects of intermediary system 120A of FIG. 2 are discussed.

Intermediary system 120B includes a point authenticator 307, authenticated point value determiner 310, and at least one additional requested yet another type of reward program reward points.

Point authenticator 307 is utilized by intermediary system 120B to authenticate, validate, or otherwise ensure that the existing points 205 provided to intermediary system 120B are legitimate points that are properly possessed by the entity providing the existing points 205. Point authenticator 307 could authenticate the existing points 205 using a number of methods such as a hash of some or all of the data included with each existing point, by accessing the reward program(s) 110, via cloud 126, to authenticate the existing points 205, the entity to which existing points 205 were issued, and the like.

In one embodiment, any unauthenticated existing points 205 would be removed from the existing points 205 by point authenticator 307. Further, point authenticator 307 could provide a flag for entity account 233 regarding the invalid points. Such a flag could result in the entity being placed under higher scrutiny, a partial or full ban on the entity utilizing the exchange, a review of other exchanges made by the entity, or the like. Once the existing points 205 are authenticated, they are passed through optional point deductor 208 to authenticated point value determiner 310.

Intermediary system 120B further allows at least one additional request for points to be made. For example, the entity may provide existing points 205 and request that x number of points be obtained for requested points 206 (e.g., a second reward program) and y number of points be obtained for requested points 306 (e.g., a third reward program). In general, the request may be for an equal amount of requested points 206 and requested points 306, a specific amount of requested points 206 and a remaining value of requested points 306, a specific amount of requested points 306 and a remaining value of requested points 206, or some combination thereof. Further, although two requested points are shown, there may be requests for points for more than two different reward programs. The use of requested points 206 and requested points 306 herein is provided for purposes of clarity. Exchanged points 350 would include the requested points 206 and requested points 306 that were exchanged.

Cellular Text Message Authentication

When included, cellular text message authenticator 275 operates to authenticate cellular text messages received wirelessly from a cellular network 105 by intermediary system 120 (e.g., intermediary system 120A, 120B, or other intermediary system similarly acting as a reward program exchange). Generally speaking, a request for points 206 sent to intermediary system 120A will come as a message request for implementing some sort of instruction with respect to reward points. The instruction may be an instruction to transfer reward points, an instruction to exchange reward points, an instruction to respond with a current balance of reward points, etc. When a request for points 206 is received from a cellular network 150 as a cellular text message, the communication has not be vetted in the manner that a "logged-in" communication received via an internet connection would typically be vetted. Accordingly, cellular text message authenticator 275 employs a technique to authenticate this cellular text message "on-ramp" method of interacting with intermediary system 120. Cellular text message authenticator 275 analyzes two factors from the cellular text message to authenticate the cellular text message prior to permitting intermediary system 120 to act on an instruction provided with the cellular text message. If either of these factors fails, then authentication of the cellular text message fails, and the instruction included in the cellular text message is not executed or acted upon.

The first factor is the cellular phone number of the device 101 which sent the cellular text message. For example, if the cellular text message came from device 101A (a smartphone of entity 102), then the phone number would belong to device 101A and be associated with accessing entity 102. Accordingly, cellular text message authenticator 275 starts by performing a lookup, in database 230, on the sending device (e.g. 101A) cellular phone number. If this cellular phone number is associated with an entity account 233, then the first factor of the authentication of the cellular text message is successful. If not, the first factor fails and there is no need to perform the second factor. The requested points message 206 received via this unauthenticated cellular text message is ignored.

The second factor of authentication involves cellular text message authenticator 275 extracting a security token from the requested points 206 message that has been received as a cellular text message. In embodiments described herein, the security token appears as data embedded in an image file (e.g., Joint Photographic Experts Group (JPEG) file, Tagged Image File Format (TIFF) file or the like) which accompanies or is attached to the cellular text message. In some embodiments the image file is of a type which supports Exchangeable image file format ("Exif") tags for geolocation. The security token itself can take a variety of forms. In one embodiment, the security token takes the form of the data of a particular pixel or group of pixels in the attached image file. This may be actual data of the pixel/pixels or it may be prearranged security data that has been substituted for the actual image data at that pixel/pixels. In another embodiment, the security token comprises geolocation information from the geolocation tag of the attached image file. The security token may be all the geolocation data (e.g., a latitude and a longitude) or part of the geolocation data (e.g., a latitude or a longitude, or a portion of one or both of the latitude and the longitude).

Cellular text message authenticator 275 attempts the second factor of authentication based on the cellular text message passing the first factor (i.e., the sending cellular telephone number is associated with an entity account 233). CTMA 275 retrieves information about the security token from the account (e.g., entity account 233) that has been located with the phone number. This information instructs CTMA 275 where, in an image file attached to the received cellular text message, to find and extract the security token for the located account. Once the security token is extracted, it is used to authenticate access to entity account 233 that was identified based upon the cellular phone number. For example, the security token may be matched to a stored version of the token, all or a predetermined number of digits of geolocation information may be matched to stored geolocation information or to geolocation information of an address (e.g., a home of record address) associated with the identified account. If a proper match takes place, then the requested points 206 received as a cellular text message is authenticated and the overall interaction is authenticated, thus allowing an instruction in the text message to be executed or otherwise acted upon by intermediary system 120A.

Through this authentication of a cellular text message sent to an intermediary system 120, accessing entities are provided with a convenient on-ramp to access reward points in a reward program by using a cellular telephone communication enabled device 101 such as a cellular telephone or cellular smart phone. Cellular text messaging (e.g., SMS and MMS) is quite ubiquitous around the world. As such, even in the absence or outage of Internet-enabled communications, reward program account access can be provided through cellular text messaging. Moreover, even when Internet access is available, an account owner may choose to access an account by cellular text message because it is convenient and/or does not require them to remember or locate an account username or an account password. For example, an accessing entity would merely need to send a cellular text message with an instruction regarding reward program points to a recipient number associated with an intermediary system 120 and include in that text message, as an attachment, a particular image that is used to transport a security token for authenticating access. The image may be prearranged such as being previously sent by the user to the intermediary system 120, received from the intermediary system 120 and stored on the device 101, or some combination (such as being supplied from the device 101, modified by having a security token imbedded at the intermediary system 120, and sent back for storage on the device 101). In other embodiments, the image may simply be taken by the device 101 at a location that is associated with an address of the account being accessed and tagged with geolocation of that location. In embodiments where geolocation information tagged to an image file captured by the device 101 is being employed as a security token, the device 101 will be equipped with a camera and a geolocation capability (e.g., via received navigation satellite system signals, info from cellular towers, information from WiFi access points, some combination, or the like) and the image geotagging feature of the device 101 is used to tag to the captured image with its geolocation, typically in a manner consistent with Exif tagging.

In some embodiments, when a cellular text message is used to interact with a reward program account and/or reward points, intermediary system 120 responds with a cellular text message to the cellular phone number from which a cellular text message was received. This cellular text message may confirm completion, indicate that the reward program account is being accessed, or provide other information.

Although the techniques for cellular text message authentication have been described in conjunction with providing authenticated access to an intermediary system 120, these techniques may be similarly applied with respect to any reward program 110. For example, a reward program 110, such as reward program 110-1, may employ a cellular text message authenticator 275 in order to provide an entity with access to and interaction with the entity's account via cellular text message. Likewise, these techniques may be utilized to log on to other computer systems and/or accounts that are independent of rewards programs or exchanges.

Figure 4:
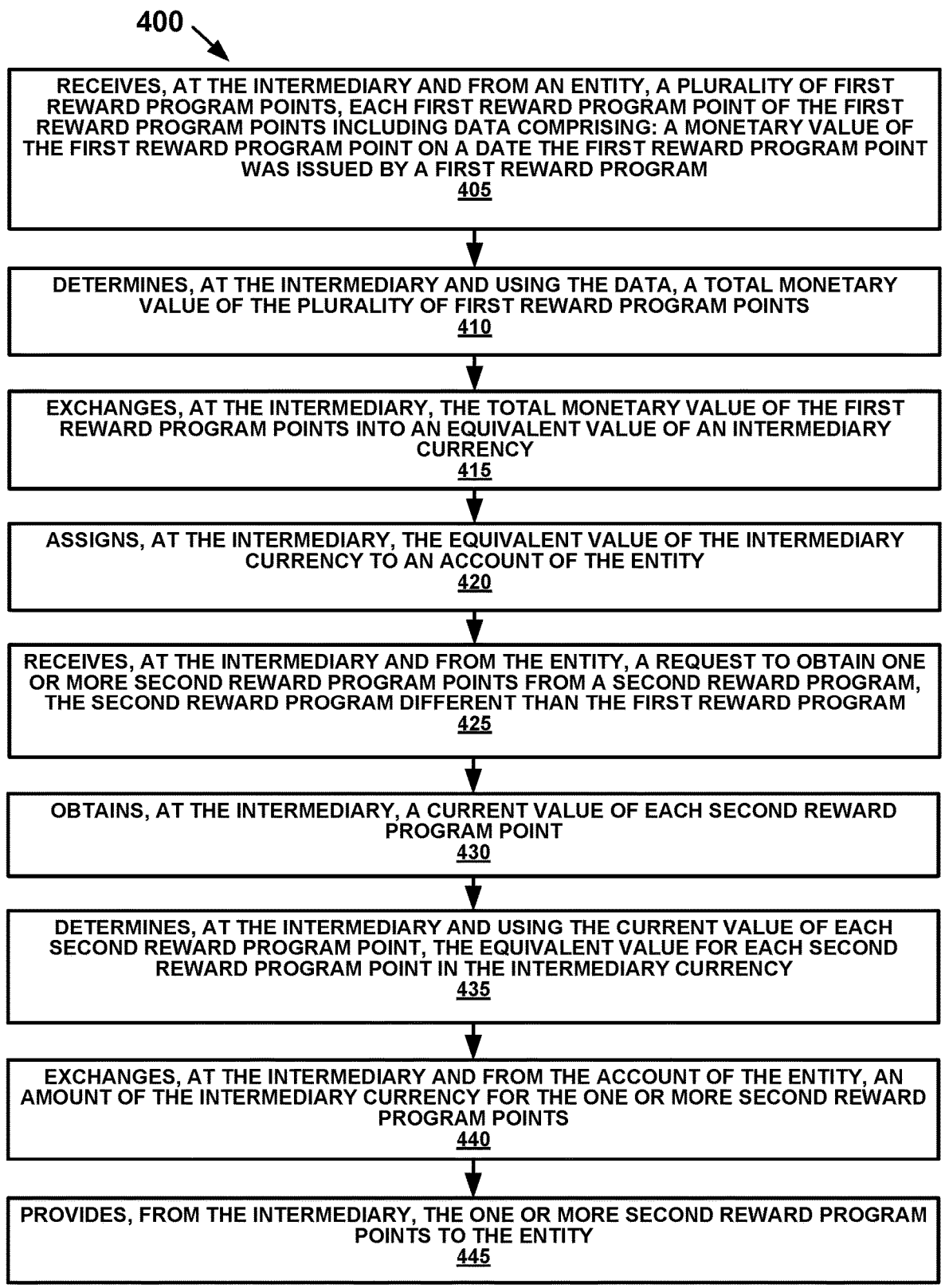
FIG. 4 depicts a flow diagram of a method for utilizing an intermediary to manage a point exchange across a plurality of different reward programs, in accordance with an embodiment.

Example Method for Utilizing an Intermediary to Manage a Point Exchange Across a Plurality of Different Reward Programs The following discussion sets forth in detail the operation of some example methods of operation. With reference to FIG. 4, flow diagram 400 illustrates example procedures used by various embodiments. Flow diagram 400 includes some procedures that, in various embodiments, are carried out by one or more processors under the control of computer-readable and computer-executable instructions. In this fashion, procedures described herein and in conjunction with flow diagram 400 are, or may be, implemented in an automated fashion using a computer, in various embodiments. The computer-readable and computer-executable instructions can reside in any tangible, non-transitory computer-readable storage media, such as, for example, in data storage features such as peripheral computer-readable storage media 602, RAM 608, ROM 610, and/or storage device 612 (all of FIG. 6) or the like. The computer-readable and computer-executable instructions, which reside on tangible, non-transitory computer-readable storage media, are used to control or operate in conjunction with, for example, one or some combination of processor(s) 606 (see FIG. 6), or other similar processor(s). Although specific procedures are disclosed in flow diagram 400, such procedures are examples.

That is, embodiments are well suited to performing various other procedures or variations of the procedures recited in flow diagram 400. Likewise, in some embodiments, the procedures in flow diagram 400 may be performed in an order different than presented and/or not all of the procedures described may be performed. It is further appreciated that procedures described in flow diagram 400 may be implemented in hardware, or a combination of hardware with firmware and/or software.

With reference now to FIG. 4, a flow diagram 400 of a method for utilizing an intermediary to manage a point exchange across a plurality of different reward programs is shown in accordance with various embodiments.

With reference now to 405 of FIG. 4 and to FIGS. 2 and 3, one embodiment receives, at the intermediary and from an entity, a plurality of first reward program reward points, each first reward program reward point of the first reward program reward points including data comprising: a monetary value of the first reward program reward point on a date the first reward program reward point was issued by a first reward program. For example, existing points 205 received by intermediary system 120A or intermediary system 120B.

One embodiment authenticates each first reward program reward point of the plurality of first reward program reward points (e.g., existing points 205) to determine a total number of authenticated first reward program reward points. For example, as discussed herein, point authenticator 307 would authenticate the existing points 205 using a number of methods such as a hash of some or all of the data included with each existing point, by accessing the reward program(s) 110, via cloud 126, to authenticate the existing points 205, the entity to which existing points 205 were issued, and the like.

In one embodiment, any unauthenticated existing points 205 would be removed from the existing points 205 by point authenticator 307. Further, point authenticator 307 could provide a flag for entity account 233 regarding the invalid points. Such a flag could result in the entity being placed under higher scrutiny, a partial or full ban on the entity utilizing the exchange, a review of other exchanges made by the entity, or the like.

In one embodiment, an optional point deductor 208 deducts, upon receipt of the plurality of first reward program reward points (or after the first reward program reward points have been authenticated), a predetermined number of first reward program reward points. For example, optional point deductor will deduct 5% of the existing points 205 from the total for each exchange. In one embodiment, the predetermined number of deducted first reward program reward points will be returned to a first retailer maintaining the first reward program 110 (e.g., 110-1). Moreover, the predetermined number of first reward program reward points will be identified as being redeemed. In one embodiment, optional point deductor 208 will utilize a network connection such as cloud 126 to access the first reward program 110-1 and inform the point program of the points redemption.

Referring now to 410 of FIG. 4 and to FIGS. 2 and 3, one embodiment determines, at the intermediary and using the data, a total monetary value of the plurality of first reward program reward points. For example, point value determiner 210 will access the point reward information for each point provided. Examples of data associated with each first reward program reward point includes data, such as but not limited to, a date the first reward program reward point was issued, a time the first reward program reward point was issued, a physical location of computing device 101 when the first reward program reward point was issued, a monetary value of the first reward program reward point on a date the first reward program reward point was issued by a first reward program, information identifying the first reward program, information identifying the entity that owns the first reward program reward point, information identifying a date the first reward program reward point was obtained by the entity, and the like.

In so doing, point value determiner 210 will be able to determine the actual monetary value of each point of existing points 205. For example, if 30,000 points were initially received at intermediary system 120A, it is likely that a number of the points would have been obtained at different times. As such, one or more of the points could have different values, or all of the points could have the same value.

For example, 30,000 points may have been received from a reward program having a defined point value of 1 round trip airline ticket worth no more than $400 dollars for every 30,000 points. Here, point value determiner 210 would determine that the total value of existing points 205 is $400.00 dollars In another example, 10,000 points were initially received at a reward program value of $0.02 per reward point. Another 5,000 points were received at a program value of $0.05 per reward point. An additional 15,000 points were received at a program value of $0.01 per reward point. As such, the point value determiner 210 would determine that the total value of existing points 205 is $600.00

In yet another example, 20,000 of the points could have been priced at 200 points for a free cup of coffee (a £3.00 value), while 10,000 of the points could have been valued at 500 points for a free sandwich (a £5.00 value). In this example, point value determiner 210 would determine that the total value of existing points 205 is £300.00.

At 415 of FIG. 4 and to FIGS. 2 and 3, one embodiment exchanges, at the intermediary, the total monetary value of the first reward program reward points into an equivalent value of an intermediary currency using point-to-currency exchanger 215. In general, the intermediary currency could be a currency or points based system. For example purposes in the following discussion, one point (or buck) of intermediary currency could be valued at $1.00.

Therefore, using the first example above (e.g., the existing points 205 having a value of $400.00 and the intermediary currency valued at $1.00 dollars), the exchange of existing points 205 (regardless of how many existing points 205 were provided) at point-to-currency exchanger 215 would result in 400 intermediary currency points, or in a currency based system, 400 intermediary currency bucks.

Using the third example above (e.g., the existing points 205 having a value of £300.00 and the intermediary currency valued at $1.00 dollars) the exchange of existing points 205 (e.g., £300.00) at point-to-currency exchanger 215 would further include the present exchange rate. For example, £1.00=$1.43 dollars. As such, the exchange of existing points 205 would result in 427.99 intermediary currency points, or intermediary currency bucks (e.g., 300*1.43).

With reference now to 420 of FIG. 4 and to FIGS. 2 and 3, one embodiment assigns, at the intermediary, the equivalent value of the intermediary currency to an account of the entity. That is, in one embodiment, after the exchange of point-to-intermediary currency, the value of the intermediary currency is added to an entity account 233 of database 230. It should be appreciated that database 230 can include a number of different entity accounts. By utilizing an entity account 233, the existing points 205 can be put into the exchange and the value stored for later utilization.

In one embodiment, a predetermined amount of intermediary currency is deducted as a use fee 287. Use fee 287 could be a flat fee, a percentage of the equivalent value of the intermediary currency, a variable fee based on a number of times the entity has used the intermediary system 120A, or a combination thereof. In one embodiment, use fee 287 could be provided to reward program management companies to offset liability created by the additional rewards fulfillments, to retailers, to a provider or maintainer of intermediary system 120A, another party, or a combination of two or more of the different parties.

Referring now to 425 of FIG. 4 and to FIG. 2, one embodiment receives, at the intermediary and from the entity, a request to obtain one or more second reward program reward points (e.g., requested points 206) from a second reward program 110-2. In general, the first reward program 110-1 is maintained by a first retailer while the second reward program 110-2 is maintained by a second retailer. The first retailer being a distinctly different corporation that is not related to the second retailer.

In one embodiment, the request for the requested points 206 does not include an amount of requested points 206. Instead, the request is to exchange as much of the intermediary currency as available, from the entity account 233, to obtain as many second reward program reward points (e.g., exchanged points 350) as possible. In another embodiment, the request for the requested points 206 includes an amount of requested points 206 to be obtained.

At 430 of FIG. 4 and referring to FIG. 2, one embodiment obtains, at the intermediary, a current value of each second reward program reward point. For example, requested point value determiner 220 determines the present value for each point of the requested points 206. In one embodiment, requested point value determiner 220 utilizes a network connection such as cloud 126 to access the reward program(s) 110 and obtain the present value of the requested points 206. For example, point value determiner 220 determines that each requested point of requested points 206 is valued at 0.35 euros.

With reference now to 435 of FIG. 4 and to FIG. 2, one embodiment determines, at the intermediary and using the current value of each second reward program reward point, the equivalent value for each second reward program reward point in the intermediary currency. That is, point-to-currency exchanger 215 will determine the value of each (or a group of) requested points 206 in the intermediary currency. Thus, using the above example, if each requested point is valued at 0.35 euros, point-to-currency exchanger 215 will utilize the present conversion rate (1 Euro=1.25 dollars) to determine that each requested point is valued at 0.44 intermediary currency points, or intermediary currency bucks (e.g., 0.35*1.25).

At 440 of FIG. 4 and referring to FIG. 2, one embodiment exchanges, at the intermediary system 120A and from the entity account 233, an amount of the intermediary currency for the one or more second reward program reward points (e.g., requested points 206). Thus, using the above examples, if the entity wanted to obtain 100 requested points 206, requested point exchanger 240 would withdraw 440 intermediary currency points, or intermediary currency bucks (e.g., 100*0.44) from entity account 233.

In one embodiment, after the entity's intermediary currency is exchanged at requested point exchanger 240 for the number of requested points 206, there may be a left over amount of intermediary currency that would remain in entity account 233. In another embodiment, all of the existing points 205 are exchanged for an equivalent value of requested points 206 and nothing will remain in entity account 233.

Referring now to 445 of FIG. 4 and to FIG. 2, one embodiment provides, from the intermediary, the one or more second reward program reward points to the entity. Using the above example, the 100 exchanged points 250 would be provided to the entity.

Referring again to 425 of FIG. 4 and now to FIG. 3, one embodiment receives, at the intermediary and from the entity, a request to obtain one or more second reward program reward points (e.g., requested points 206) from a second reward program 110-2 and one or more third reward program reward points (e.g., requested points 306), the third reward program 110-3 different from both the second reward program 110-2 and the first reward program 110. In one embodiment, the request for requested points 306 does not include an amount of requested points 306. Instead, the request is to exchange as much of the intermediary currency that remains, from the entity account 233, to obtain as many third reward program reward points as possible. In another embodiment, the request for requested points 306 includes an amount of requested points 306 to be obtained.

Referring again to 430 of FIG. 4 and now to FIG. 3, one embodiment obtains, at the intermediary, a current value of each third reward program reward point. For example, requested point value determiner 220 determines the present value for each point of the requested points 206 and requested points 306. In one embodiment, requested point value determiner 220 utilizes a network connection such as cloud 126 to access the reward program(s) 110 (e.g., programs 110-2 and 110-3 to 110-N of FIG. 1) to obtain the present value of the requested points 206 and requested points 306. For example, point value determiner 220 determines that each requested point of requested points 306 is valued at $0.05.

Similarly, with reference again to 435 of FIG. 4 and now to FIG. 3, one embodiment determines, at the intermediary and using the current value of each third reward program reward point, the equivalent value for each third reward program reward point in the intermediary currency. That is, point-to-currency exchanger 215 will determine the value of each (or a group of) requested points 306 in the intermediary currency. Thus, using the above example, if each requested points 306 is valued at $0.05, point-to-currency exchanger 215 will determine that each requested point is valued at 0.05 intermediary currency points, or intermediary currency bucks.

Once again at 440 of FIG. 4 and now to FIG. 3, one embodiment exchanges, at the intermediary system 120B and from the entity account 233, an amount of the intermediary currency for the one or more second reward program reward points (e.g., requested points 206) and the one or more third reward program reward points (e.g., requested points 306). Thus, using the above examples, if the entity wanted to obtain 100 requested points 206 and 10,000 requested points 306, requested point exchanger 240 would withdraw 940 intermediary currency points, or intermediary currency bucks from entity account 233. For example, 440 intermediary currency points/bucks (e.g., 100*0.44) to cover the exchange of requested points 206 as well as 500 intermediary currency points/bucks (e.g., 10,000*0.05) to cover the exchange of requested points 306.

In one embodiment, after the entity's intermediary currency is exchanged at requested point exchanger 240 for the number of requested points 206 and requested points 306. There may be a left over amount of intermediary currency that would remain in entity account 233. In another embodiment, all of the existing points 205 are exchanged for an equivalent value of requested points 206 and requested points 306 and nothing will remain in entity account 233.

Referring again to 445 of FIG. 4 and now to FIG. 3, one embodiment provides, from the intermediary, the one or more second reward program reward points and third reward program reward points to the entity. Using the above example, the 100 second program points and the 500 third program reward points would be provided to the entity via exchanged points 350.

Example Method of Authenticated Reward Program Account Interaction

The following discussion sets forth in detail the operation of some example methods of operation. With reference to FIG. 5, flow diagram 500 illustrates example procedures used by various embodiments. Flow diagram 500 includes some procedures that, in various embodiments, are carried out by one or more processors under the control of computer-readable and computer-executable instructions. In this fashion, procedures described herein and in conjunction with flow diagram 500 are, or may be, implemented in an automated fashion using a computer, such as computer system 600 of FIG. 6, in various embodiments. The computer-readable and computer-executable instructions can reside in any tangible, non-transitory computer-readable storage media, such as, for example, in data storage features such as peripheral computer-readable storage media 602, RAM 608, ROM 610, and/or storage device 612 (all of FIG. 6) or the like. The computer-readable and computer-executable instructions, which reside on tangible, non-transitory computer-readable storage media, are used to control or operate in conjunction with, for example, one or some combination of processor(s) 606 (see FIG. 6), or other similar processor(s). Although specific procedures are disclosed in flow diagram 500, such procedures are examples. That is, embodiments are well suited to performing various other procedures or variations of the procedures recited in flow diagram 500. Likewise, in some embodiments, procedures in flow diagram 500 may be performed in an order different than presented and/or not all of the procedures described may be performed. It is further appreciated that procedures described in flow diagram 500 may be implemented in hardware, or a combination of hardware with firmware and/or software.

FIGS. 5A-5C depict a flow diagram 500 of a method of authenticated reward program account interaction, in accordance with various embodiments.

Referring now to FIG. 5A, at procedure 510 of flow diagram 500, in one embodiment a computer system of a reward program exchange receives a cellular text message sent from a cellular telephone of an accessing entity. The cellular text message is sent wirelessly via a cellular network, such as cellular network 105, and may also be received via wireless communication with a cellular network. The cellular text message includes a cellular telephone number of the cellular telephone, an instruction regarding reward points, and an image file. The cellular text is one or some combination of SMS and MMS text messages. As will be further discussed, the image file includes an authentication token as part of its data. With reference to FIGS. 2 and 3, the points request 206/306 may be received as this cellular text message. The reward program exchange may be an intermediary system 120, similar to those depicted in FIGS.

1-3, or may be a reward program 110 (e.g., reward program 110-1) which may run its own exchange. The reward program exchange may be or include aspects of a computer system, such as computer system 600 of FIG. 6, to include a cellular telephony communication device 675 which operates to receive and/or send cellular text messages over a cellular network 105. The cellular telephone may be plain cellular telephone (i.e., not a "smart phone") which has no internet access capability, or it may be a smartphone which does have internet access capabilities. In other embodiments, the cellular telephone may be a satellite telephone or other device which communicates messages via SMS and/or MMS protocols.

At procedure 520 of flow diagram 500, in one embodiment a computer system of a reward program exchange uses the cellular telephone number to identify a reward program account. This comprises the recipient computer system (e.g., an intermediary system 120) parsing the phone number from the cellular text message and utilizing the phone number to search for a reward program account associated with the phone number. For example, this may comprise cellular text message authenticator 275 parsing the cellular phone number from the received cellular text message and providing it to database 230 with instruction to perform a search to see if the phone number can be matched to an account for a reward program. If so, a matching entity account 233 will be found. If not, no further action may be taken in this method.

At procedure 530 of flow diagram 500, in one embodiment a computer system of a reward program exchange extracts an authentication token embedded in data of the image file. This may comprise CTMA 275 extracting the authentication token from pixel data for a predetermined pixel within the image file. For example, in some embodiments it may be predetermined that the authentication token will be the data of or data placed at the location of the first pixel data in the image file, or the data of or data placed at the location of the bottom left corner pixel of the image file, or the data of or data placed at the location of the top right corner pixel of the image file, etc. In other embodiments, the image file data may comprise location data tagged to the image file. For example, in some embodiments, the image file comprises an Exif image file and the extracting of an authentication token embedded in data of the image file comprises CTMA extracting location data from a header of the Exif image file or other region where location data is tagged to the file. It may be predetermined that the all or some portion of the latitude and/or longitude should be extracted. For example, in some embodiments, the identified entity account 233 associated with the cellular telephone number may describe which location information should be extracted, such as the first 5 digits of a longitude or the first 6 digits of a latitude. The authentication token may also comprise a time of capture of the image that is also included as a tag in the image file, and which may be extracted.

At procedure 540 of flow diagram 500, in one embodiment a computer system of a reward program exchange authenticates access to the reward program account based upon the authentication token. This may comprise CTMA 275 comparing the extracted authentication token to confirm that an aspect of it matches a stored authentication token associated with the reward program account (i.e., the identified entity account 233). The comparison may be a direct comparison of all or a certain portion of the tokens to ensure an overlap match. The comparison may also involve actions such as performing a hash or other function on the extracted authentication token and then matching the result to the stored authentication token. In some embodiments, where a stored token for the reward program account comprises at least one of a latitude and a longitude, the authentication may involve confirming a match or overlap between a predetermined portion (up to all) of the extracted token and the stored token. This can be a match between a portion of the latitude, longitude, or both. In some embodiments, the stored location data (e.g., latitude and/or longitude) may be for an address associated with the reward program account, such as a home address. Thus, an accessing entity may simply capture a location tagged photo with device 101 while at or near that address and attach that photo to the requested points 206 cellular text message sent to a text message number associated with intermediary system 120. When CTMA 275 succeeds in authenticating the interaction with the security token supplied in the image file, then intermediary system 120 is permitted to carry out the instruction with respect to reward points that was included in the cellular text message.

At procedure 550 of flow diagram 500, in one embodiment, in response to authenticating access to the reward program account, a computer system of a reward program exchange executes the instruction. Executing the instruction can comprise a computer system such as intermediary system 120 taking the action with respect to the reward points of the identified reward account 233. After executing the instruction, a confirmation message may be sent to the first cellular telephone number via a cellular text message.

Referring now to FIG. 5B, at procedure 551 of flow diagram 500, when the instruction at procedure 550 comprises a request for a current reward point balance. For example, the instruction may have been: "tell me my reward point balance." In one embodiment a computer system of a reward program (e.g., intermediary system 120) sends to the cellular telephone number of the received cellular text message, a second cellular text message comprising a total number of reward points in the reward program account. This point balance may be retrieved from the identified entity account 233 or may be retrieved by a computer system (e.g., intermediary system 120) from a reward program (e.g., from reward account of reward program 110-1) to which the points have been accrued. After retrieved, intermediary system 120 sends the balance via a second cellular text message to the cellular telephone number from which the points request 206 in the form of a cellular text message was received. For example, the second cellular text message may be: "You have 2,000 reward points."

In another embodiment, the instruction may be to exchange a certain number of reward points for cash to be sent to a bank account linked to identified entity account 233. For example, the instruction may have been: "transfer 1,500 reward points to my bank account." In such an embodiment, intermediary system 120 ensures the points are available, deducts them from the identified entity account 233, converts them to currency, and deposits the currency into a bank account designated by/associated with the identified entity account 233. After the deposit into the bank account, intermediary system 120 may indicate that the exchange has been completed by sending a second cellular text message to the cellular telephone number from which the points request 206 in the form of a cellular text message was received.

With reference to FIG. 5C, in one embodiment where the instruction in procedure 550 comprises a request to transfer a specified number of reward points from the reward program account to a second reward program account associated with a second entity, and executing the instruction is described by procedures 550, 552, 553, 554, 555, and 556.

The procedure for this peer-to-peer transfer of reward points involves performing a second cellular text message authentication.

At procedure 552, in one embodiment, a computer system such as intermediary system 120 sends a request for authentication for the peer-to-peer transfer. The request for authentication is sent via a second cellular text message to a second cellular telephone number associated with the second reward program account. For example, the instruction may have been: "Please respond with your authentication token to authenticate a points transfer." The second cellular phone number has been supplied instruction of the original cellular text message. For example, the instruction may have been: "transfer 1,500 points to 1-408-555-1212." In an embodiment where this instruction is received via a cellular text message from device 101B and entity 102, the second cellular text message may be sent to device 101B and entity 104. If either of these authentications fails, the method may end.

At procedure 553, in one embodiment a computer system such as intermediary system 120 receives from the second cellular telephone number a second image file that has been sent in response to the request for authentication. If the second entity account is not specifically identified in the instruction, at the same time, before, or after sending the request for authentication, database 230 is employed (in the manner described in procedure 520) to locate and authenticate a second entity account associated with the second cellular phone number and into which the 1,500 rewards points can be transferred.

At procedure 554, in one embodiment a computer system such as intermediary system 120 extracts a second authentication token embedded in data of the second image file. This extraction is performed in any of the manners previously described herein with respect to procedure 530 and may be guided by information in the second entity account.

At procedure 555, in one embodiment a computer system such as intermediary system 120 authenticates access to the second reward program account based upon the authentication token that has been extracted from the second image file. This authentication can be performed in the same manner as previously described herein with respect to procedure 540.

At procedure 556, in one embodiment, in response to the authenticated access to the second reward program account, a computer system such as intermediary system 120 executes the instruction by transferring the specified number of reward points from the reward program account (i.e., the identified entity account 233) to the second reward program account (i.e., a second entity account that was identified in the cellular text message or discovered by searching database 230 with the second cellular phone number).

Example Computer System

Figure 6:
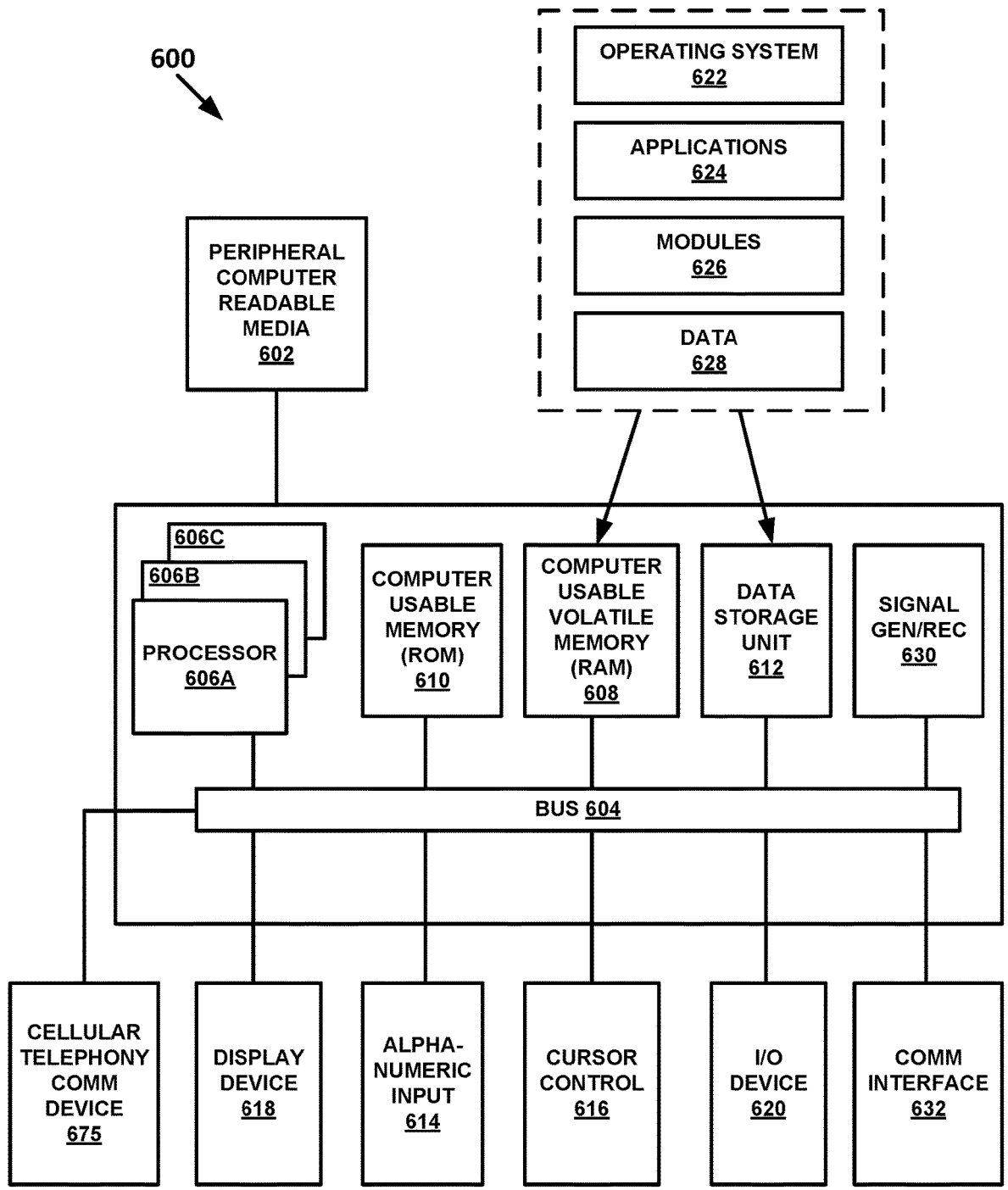
FIG. 6 is a block diagram of an example computer system with which or upon which various embodiments of the present invention may be implemented.

With reference now to FIG. 6, portions of the technology for providing a communication composed of computer-readable and computer-executable instructions that reside, for example, in a non-transitory computer-readable medium, a non-transitory computer-readable storage medium, or in non-transitory computer-readable storage media of a computer system. That is, FIG. 6 illustrates one example of a type of computer that can be used to implement embodiments of the present technology. FIG. 6 represents a system or components that may be used in conjunction with aspects of the present technology. In one embodiment, some or all of the components described herein may be combined with some or all of the components of FIG. 6 to practice the present technology.

FIG. 6 illustrates an example computer system 600 used in accordance with embodiments of the present technology. It is appreciated that system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a disk, a compact disc, a flash drive, and the like coupled thereto.

Computer system 600 of FIG. 6 includes an address/data/control bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of the various types of microprocessors. Computer system 600 also includes data storage features such as a computer usable volatile memory 608, e.g., random access memory (RAM), coupled to bus 604 for storing information and instructions for processors 606A, 606B, and 606C.

System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic disk drive, optical disk drive, solid state drive (SSD), and the like) coupled to bus 604 for storing information and instructions. Computer system 600 also includes an optional alpha-numeric input device 614 including alphanumeric and function keys coupled to bus 604 for communicating information and command selections to processor 606A or processors 606A, 606B, and 606C. Computer system 600 also includes an optional cursor control device 616 coupled to bus 604 for communicating user input information and command selections to processor 606A or processors 606A, 606B, and 606C. Optional cursor control device may be a touch sensor, gesture recognition device, and the like. Computer system 600 of the present embodiment also includes an optional display device 618 coupled to bus 604 for displaying information.

Referring still to FIG. 6, optional display device 618 of FIG. 6 may be a liquid crystal device, cathode ray tube, OLED, plasma display device or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick, non-contact input, gesture recognition, voice commands, bio recognition, and the like. In addition, special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

System 600 is also well suited to having a cursor directed by other means such as, for example, voice commands. Computer system 600 also includes an I/O device 620 for coupling system 600 with external entities. For example, in one embodiment, I/O device 620 is a modem for enabling wired or wireless communications between system 600 and an external network such as, but not limited to, the Internet or intranet. A more detailed discussion of the present technology is found below.

Referring still to FIG. 6, various other components are depicted for system 600. Specifically, when present, an operating system 622, applications 624, modules 626, and data 628 are shown as typically residing in one or some combination of computer usable volatile memory 608, e.g., random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the internet. In one embodiment, the present technology, for example, is stored as an application 624 or module 626 in memory locations within RAM 608 and memory areas within data storage unit 612. The present technology may be applied to one or more elements of described system 600.

System 600 also includes one or more signal generating and receiving device(s) 630 coupled with bus 604 for enabling system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from system 600. Communication interface 632 may include a serial port, parallel port, Universal Serial Bus (USB), Ethernet port, Bluetooth, thunderbolt, near field communications port, WiFi, Cellular modem, or other input/output interface. Communication interface 632 may physically, electrically, optically, or wirelessly (e.g., via radio frequency) couple computer system 600 with another device, such as a mobile phone, radio, or computer system. Cellular telephony communication device 675 interacts wirelessly with a cellular telephone network to send and receive messages via one or more cellular messaging services such as SMS (short message service) and/or MMS (multimedia message service).

The computing system 600 is only one example of a suitable computing environment and is not intended to suggest any limitation as to the scope of use or functionality of the present technology. Neither should the computing environment be interpreted as having any dependency or requirement relating to any one or combination of components illustrated in the example computing system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method of authenticated reward program account interaction, the method comprising:
   receiving, by a computer system of a reward program exchange, a cellular text message sent from a cellular telephone of an accessing entity, wherein the cellular text message includes a cellular telephone number of the cellular telephone, an instruction regarding reward points, and an image file, wherein the image file comprises an Exif image file;
   using, by the computer system, the cellular telephone number to identify a reward program account;
   extracting, by the computer system, an authentication token embedded in data of the image file, wherein the extracting an authentication token embedded in data of the image file comprises: extracting location data from a header of the Exif image file;
   authenticating, by the computer system, access to the reward program account based upon the authentication token, wherein the authenticating comprises:
      confirming a match between a portion of a stored token for the reward program account comprising: at least one of a latitude and a longitude of an address associated with the reward program account token, and a predetermined number of digits of one of at least one of a latitude and a longitude of the address; and
   responsive to authenticating access to the reward program account, executing, by the computer system, the instruction regarding reward points.

2. The method as recited in claim 1, wherein the extracting an authentication token embedded in data of the image file comprises:
   extracting the authentication token from pixel data for a predetermined pixel within the image file.

3. The method as recited in claim 2, wherein the authenticating access to the reward program account based upon the authentication token comprises:
   confirming the extracted authentication token matches a stored authentication token associated with the reward program account.

4. The method as recited in claim 1, wherein the authenticating access to the reward program account based upon the authentication token comprises:
   confirming that an aspect of the location data matches a stored authentication token associated with the reward program account.

5. The method as recited in claim 1, wherein the instruction comprises a request for an account balance, and wherein the executing the instruction comprises:

sending, by the computer system to the cellular telephone number, a second cellular text message comprising a total number of reward points in the reward program account.

6. The method as recited in claim 1, wherein the instruction comprises a request to transfer a specified number of reward points from the reward program account to a second reward program account associated with a second entity, and wherein the executing the instruction comprises:
- sending, by the computer system, a request for authentication via a second cellular text message to a second cellular telephone number associated with the second reward program account;
- receiving from the second cellular telephone number a second image file;
- extracting, by the computer system, a second authentication token embedded in data of the second image file;
- authenticating, by the computer system, access to the second reward program account based upon the authentication token; and
- responsive to authenticating access to the second reward program account, transferring, by the computer system, the specified number of reward points from the reward program account to the second reward program account.

7. A non-transitory computer readable storage medium having computer readable program instructions stored thereon which, when executed, cause a computer system to perform a method of authenticated reward program account interaction, the method comprising:
- receiving, by a computer system of a reward program exchange, a cellular text message sent from a cellular telephone of an accessing entity, wherein the cellular text message includes a cellular telephone number of the cellular telephone, an instruction regarding reward points, and an image file, wherein the image file comprises an Exif image file;
- using, by the computer system, the cellular telephone number to identify a reward program account;
- extracting, by the computer system, an authentication token embedded in data of the image file, wherein the extracting an authentication token embedded in data of the image file comprises: extracting location data from a header of the Exif image file;
- authenticating, by the computer system, access to the reward program account based upon the authentication token, wherein the authenticating comprises:
- confirming a match between a portion of a stored token for the reward program account comprising: at least one of a latitude and a longitude of an address associated with the reward program account token, and a predetermined number of digits of one of at least one of a latitude and a longitude of the address; and
- responsive to authenticating access to the reward program account, executing, by the computer system, the instruction regarding reward points.

8. The non-transitory computer readable storage medium of claim 7, wherein the extracting an authentication token embedded in data of the image file comprises:
- extracting the authentication token from pixel data for a predetermined pixel within the image file.

9. The non-transitory computer readable storage medium of claim 8, wherein the authenticating access to the reward program account based upon the authentication token comprises:
- confirming the extracted authentication token matches a stored authentication token associated with the reward program account.

10. The non-transitory computer readable storage medium of claim 7, wherein the authenticating access to the reward program account based upon the authentication token comprises:
- confirming that an aspect of the location data matches a stored authentication token associated with the reward program account.

11. The non-transitory computer readable storage medium of claim 7, wherein the instruction comprises a request for an account balance, and wherein the executing the instruction comprises:
- sending, by the computer system to the cellular telephone number, a second cellular text message comprising a total number of reward points in the reward program account.

12. The non-transitory computer readable storage medium of claim 7, wherein the instruction comprises a request to transfer a specified number of reward points from the reward program account to a second reward program account associated with a second entity, and wherein the executing the instruction comprises:
- sending, by the computer system, a request for authentication via a second cellular text message to a second cellular telephone number associated with the second reward program account;
- receiving from the second cellular telephone number a second image file;
- extracting, by the computer system, a second authentication token embedded in data of the second image file;
- authenticating, by the computer system, access to the second reward program account based upon the authentication token; and
- responsive to authenticating access to the second reward program account, transferring, by the computer system, the specified number of reward points from the reward program account to the second reward program account.

* * * * *